US007226249B2

(12) United States Patent
Tsuchitani et al.

(10) Patent No.: US 7,226,249 B2
(45) Date of Patent: Jun. 5, 2007

(54) BALL NOSE CUTTING INSERT AND BALL END MILL THEREOF

(75) Inventors: Masaya Tsuchitani, Tsukuba (JP); Hiroshi Shimomura, Tsukuba (JP); Yasutaka Okazaki, Kakogawa (JP)

(73) Assignees: Mitsubishi Materials Corporation, Tokyo (JP); Mitsubishi Materials Kobe Tools Corporation, Hyogo-Ken (JP)

( * ) Notice: Subject to any disclaimer, the term of this patent is extended or adjusted under 35 U.S.C. 154(b) by 51 days.

(21) Appl. No.: 10/978,211

(22) Filed: Oct. 29, 2004

(65) Prior Publication Data

US 2006/0093445 A1  May 4, 2006

(51) Int. Cl.
*B23C 5/20* (2006.01)
(52) U.S. Cl. .............................. 407/42; 407/48; 407/54
(58) Field of Classification Search .................. 407/33, 407/34, 40, 42, 48, 53, 54; *B23C 5/20, 5/22*
See application file for complete search history.

(56) References Cited

U.S. PATENT DOCUMENTS

| 5,782,589 | A | * | 7/1998 | Cole ............................. 408/233 |
| 5,915,888 | A | * | 6/1999 | Minicozzi ....................... 407/54 |
| 6,123,487 | A | * | 9/2000 | Mina ............................. 407/42 |
| 6,231,275 | B1 | * | 5/2001 | Kunimori et al. .............. 407/42 |
| 6,582,165 | B1 | * | 6/2003 | Baba ........................... 408/233 |

FOREIGN PATENT DOCUMENTS

| JP | 4-146015 | 5/1992 |
| JP | 10291116 A | * 11/1998 |

OTHER PUBLICATIONS

Patent Abstracts of Japan for JP04-146015 published on May 20, 1992.

* cited by examiner

*Primary Examiner*—Monica Carter
*Assistant Examiner*—Sara Addisu
(74) *Attorney, Agent, or Firm*—Darby & Darby

(57) ABSTRACT

In this insert, in addition to the insert being formed so that the cutting edge is twisted at a helix angle within the range of 5° to 25° about the axis when the insert is attached to the insert mounting seat, the thickness of the insert body at the flank located on a straight line, which passes through the center of the rough hemisphere formed by the rotational locus of the cutting edge and forms an angle of inclination of 90° relative to the axis, is set to be within the range of 0.5 D to 0.9 D relative to the thickness D of the rough plate that composes the insert body. As a result, since a comparatively gentle but adequately large helix angle is imparted to the cutting edge, cutting resistance decreases. In addition, since the thickness of the insert body at the flank on the rear end side of the insert body is not excessively thin, the rigidity of the insert body is adequately secured.

20 Claims, 3 Drawing Sheets

BALL NOSE CUTTING INSERT AND BALL END MILL THEREOF

BACKGROUND OF THE INVENTION

1. Field of the Invention

The present invention relates to a throwaway insert (to be referred to as an insert) provided with a roughly circular cutting edge removably attached to a throwaway-type ball end mill (to be referred to as a ball end mill).

2. Description of the Related Art

A ball end mill is known in the prior art in which an insert, on which a roughly circular cutting edge is formed on a certain flank on a roughly plate-shaped insert body, is inserted into a groove-shaped insert mounting seat formed on the distal end of a tool body that rotates about an axis, and attached to the insert mounting seat so that the rotational locus of the roughly circular cutting edge about the axis is roughly hemispherical.

As disclosed in, for example, Japanese Unexamined Patent Application, First Publication No. 4-146015, one example of an insert used in this type of ball end mill consists is that in which, when the tool body in which the insert is attached to the insert mounting seat is viewed from the distal end in the direction of its axial rotation, the roughly circular cutting edge formed on a flank of the insert body is in the form of a convex curve that protrudes towards the front side in the direction of tool rotation.

In this insert, since the roughly circular cutting edge is twisted about the axis towards the rear side in the direction of tool rotation as it moves towards the rear end side in the axial direction, the degree of cutting by the cutting edge is satisfactory and cutting resistance is decreased.

When a roughly circular cutting edge formed on a flank of the insert body is twisted about the axis towards the rear side in the direction of tool rotation as it moves towards the rear end side in the axial direction, the thickness of the insert body at the flank on which the cutting edge is formed gradually decreases moving toward the rear end side in the axial direction. As a result, the thickness of the flank unavoidably tends to decrease on the rear end side of the insert body.

However, the thickness of the insert body as described above is not taken into consideration at all in the insert disclosed in the aforementioned publication. Moreover, since the helix angle of the cutting edge is set to an extremely large angle of 20° to 40°, on the rear end side of the insert body, the thickness of the insert body at the flank becomes excessively thin, and as a result, the rigidity of the insert body is unable to be adequately secured, thereby resulting in the possibility of being unable to carry out stable cutting processing.

In consideration of the aforementioned problems, the object of the present invention is to provide an insert and a ball end mill to which this insert is attached that allows stable cutting processing while maintaining satisfactory cutting by the cutting edge and reducing cutting resistance without lowering the rigidity of the insert body.

SUMMARY OF THE INVENTION

The insert of the present invention has a roughly circular cutting edge formed on a certain flank that is the outermost surface of a roughly plate-shaped insert body, is inserted into a groove-shaped insert mounting seat formed on the distal end of a cutting tool that is rotated about an axis, and is attached to the insert mounting seat so that the rotational locus of the cutting edge about the axis is roughly hemispherical. In addition to this insert being formed so that the cutting edge is twisted at a helix angle within the range of 5° to 25° about the axis when the insert is attached to the insert mounting seat, the thickness of the insert body at the flank located on a plane, which passes through the center of the rough hemisphere formed by the rotational locus of the cutting edge and forms an angle of inclination of 90° relative to the axis, is set to be within the range of 0.5 D to 0.9 D relative to the thickness D of the rough plate that composes this insert body.

In the insert of the present invention, when the insert is attached to the insert mounting seat, as a result of the helix angle of the cutting edge twisted about the axis and the thickness of the insert body being set to the ranges as described above, since a comparatively gentle but adequately large helix angle is imparted to the cutting edge, cutting resistance decreases and satisfactory cutting is obtained. In addition, since the thickness of the insert body at the flank on the rear end side of the insert body is not excessively thin, the rigidity of the insert body is adequately secured, thereby enabling stable cutting processing.

In addition, in the insert of the present invention, the point on the cutting edge that protrudes farthest towards the front in the direction of tool rotation when the insert is attached to the insert mounting seat is preferably located on a straight line that passes through the center of the rough hemisphere formed by the rotational locus of the cutting edge and forms an angle of inclination of 40° to 70° relative to the axis. As a result of employing this constitution, the helix angle of the cutting edge and the thickness of the insert body can be set in proper balance within the ranges described above.

In addition, in the insert of the present invention, a chamfer formed by cutting away the rear end side of a flank of the insert body towards the rear end surface of the insert body is preferably formed in the insert body. As a result of employing this constitution, a section where the thickness of the insert body becomes particularly thin is eliminated, thereby making it possible to enhance the strength of the insert body.

In addition, the ball end mill according to the present invention has the insert of the present invention inserted into a groove-shaped insert mounting seat formed on the distal end of a tool body that is rotated about an axis, and the insert is attached to the insert mounting seat so that the rotational locus of the cutting edge about the axis is roughly hemispherical.

DETAILED DESCRIPTION OF THE PREFERRED EMBODIMENTS

The following provides an explanation of embodiments of the present invention with reference to the attached drawings.

Figure 1:
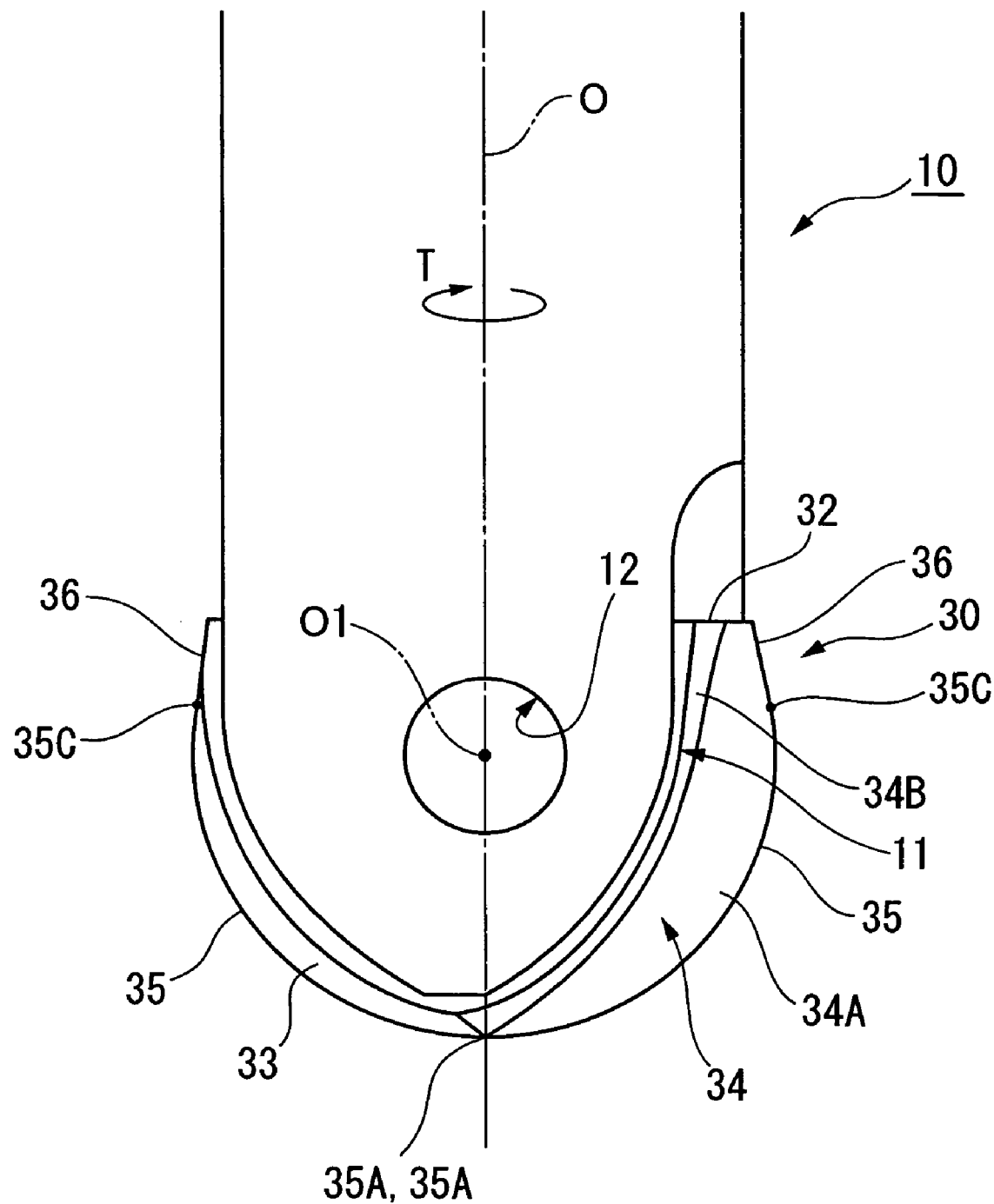
FIG. 1 is a side view showing an embodiment of a ball end mill of the present invention.

As shown in FIG. 1, a tool body 10 of a ball end mill in the present embodiment has a roughly columnar shape centering on axis O, and a groove-shaped insert mounting seat 11 that is indented to the rear end side along axis O is formed in its distal end.

Figure 2:
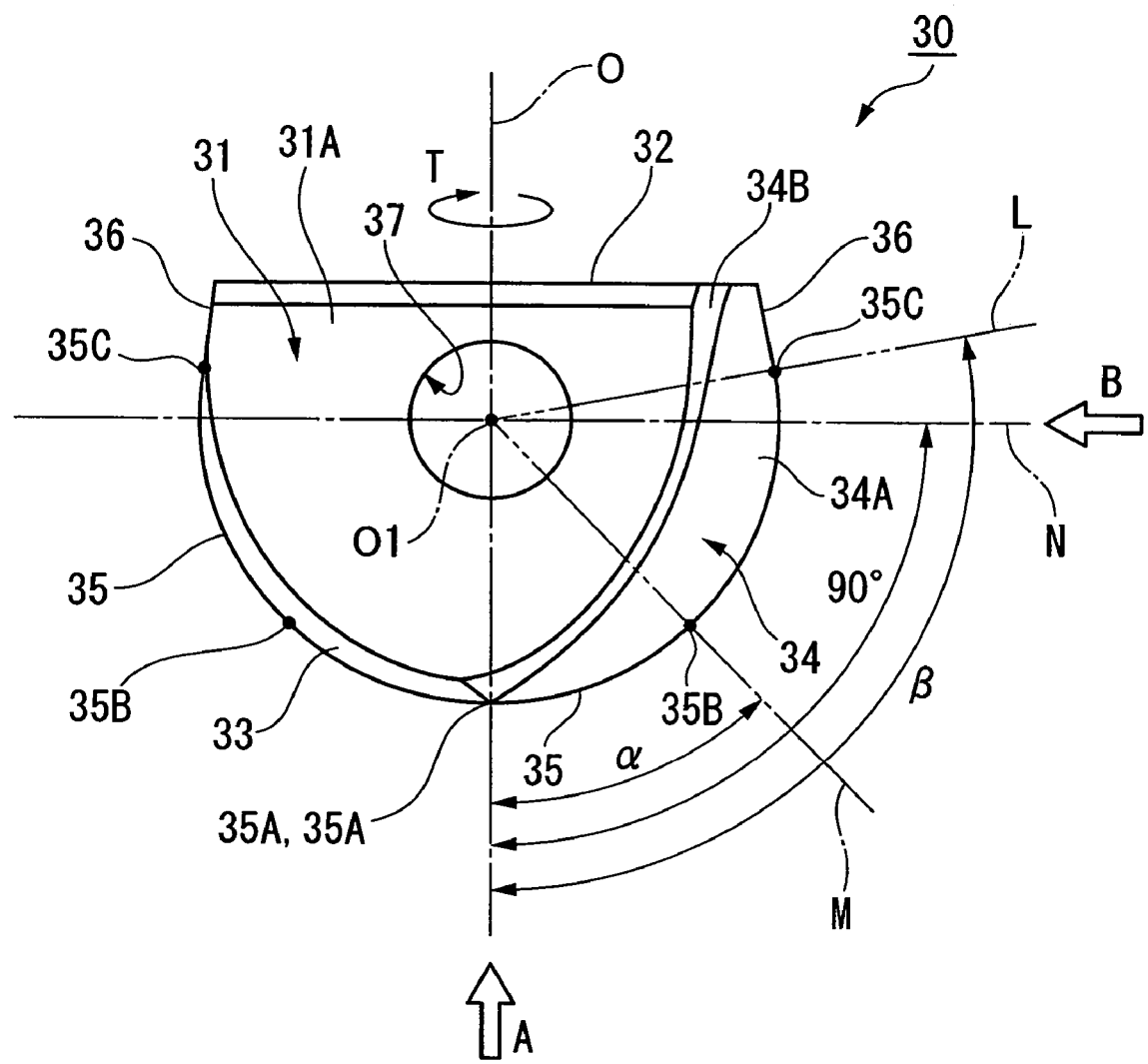
FIG. 2 is an overhead view showing an embodiment of an insert of the present invention.
Figure 3:
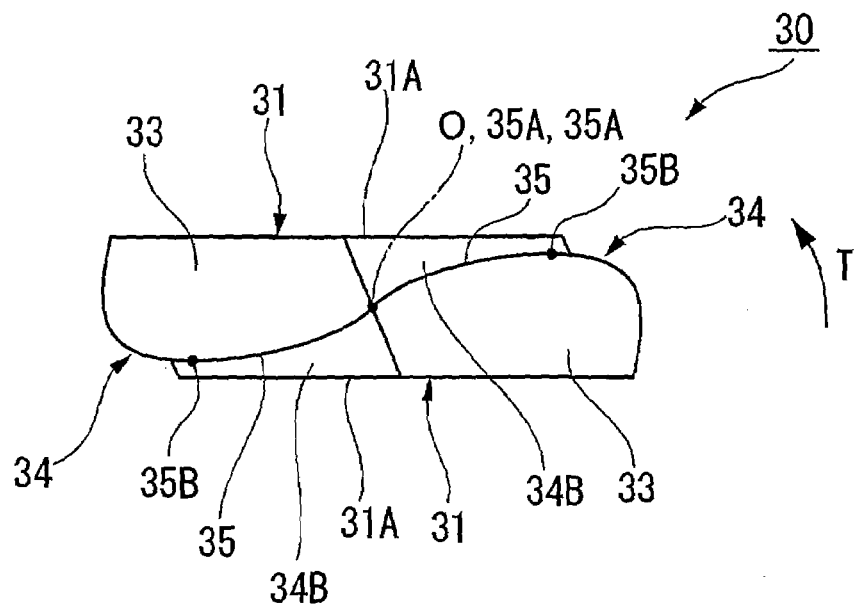
FIG. 3 is a view taken along direction A in FIG. 2.
Figure 4:
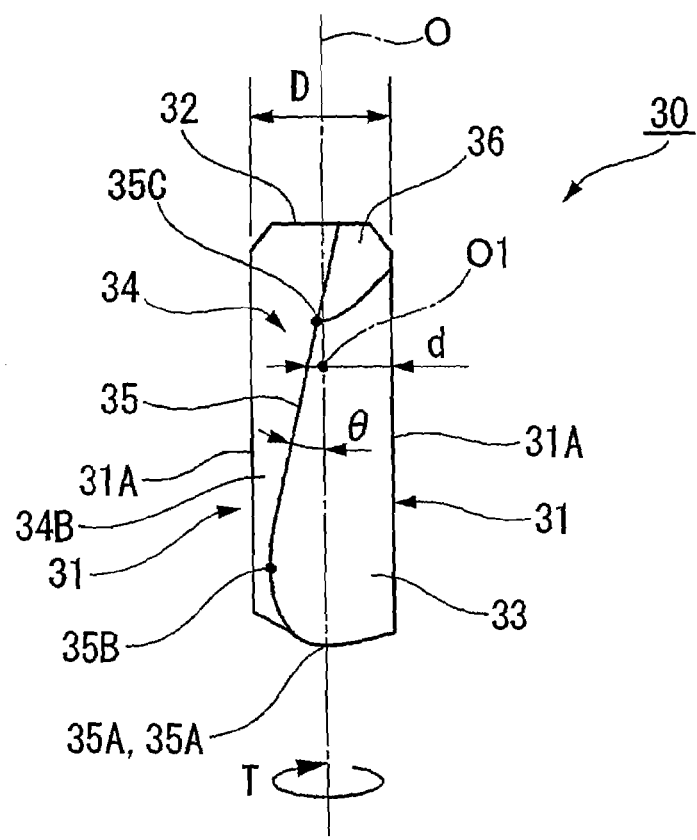
FIG. 4 is a view taken along direction B in FIG. 2.

An insert as shown in FIGS. 2 through 4 is inserted into and attached to insert mounting seat 11. A ball end mill to which an insert is attached cuts a work piece with a cutting edge 35 formed on the insert by moving its tool body 10 in the direction that intersects axis O while rotating towards the front side in the direction of tool rotation T centering on axis O.

As shown in FIGS. 2 through 4, an insert body 30 of the insert is formed from a hard material such as cemented carbide in roughly the shape of a plate that forms a roughly semicircular shape when viewed from overhead. In the state in which the insert is attached to insert mounting seat 11 (to be referred to as the insert mounted state), a pair of side faces 31 that face in the direction of thickness of the rough plate that composes insert body 30 (vertical directions in FIG. 3 and lateral directions in FIG. 4) are formed so as to be symmetrical relative to axis O of tool body 10.

Among the peripheral surfaces of insert body 30 formed between the pair of side faces 31, rear end surface 32 that faces toward the rear end side in the direction of axis O in the insert mounted state forms a roughly straight line that extends in the direction that roughly orthogonalizes axis O when viewed from overhead as shown in FIG. 2.

In addition, among the peripheral surfaces of insert body 30 formed between the pair of side faces 31, flanks 33, which are the sections excluding the aforementioned rear end surface 32 that are the outer peripheral surfaces facing towards the distal side and outer peripheral side in the direction of axis O in the insert mounted state, are composed of a roughly semicircular section located on the distal end side when viewed from overhead as shown in FIG. 2, and a roughly linear section located between both ends of this roughly semicircular section and both ends of rear end surface 32 and which intersects rear end surface 32 (chamfers 36 to be described later are formed in the roughly linear section on the rear end sides of flanks 33).

In addition, mutually parallel flat surfaces 31A are formed in the section of the pair of side faces 31 of insert body 30 excluding the edge on the side facing the front side in the direction of tool rotation T in the insert mounted state. On the other hand, grooves 34 that open to flanks 33 by being indented even more from flat surfaces 31A are provided from the vicinity of the intersection of axis O and flanks 33 over rear end surface 32 in the edges of the pair of side faces 31 on the side facing the front side in the direction of tool rotation T in the insert mounted state.

Moreover, among the grooves 34 respectively formed in the pair of side faces 31, cutting edges 35 having bottom surfaces 34A as their cutting faces are formed on the outside ridges of bottom surfaces 34A facing towards the front side in the direction of tool rotation T in the insert mounted state, namely on the intersecting ridges between bottom surfaces 34A of grooves 34 and flanks 33 of insert body 30.

Namely, together with corresponding distal ends (inner peripheral ends) 35A roughly mutually coinciding on axis O symmetrical with respect to axis O in the insert mounted state, a pair of roughly circular cutting edges 35 are formed so that the rotational locus about axis O is roughly in the shape of a hemisphere having center O1 on axis O.

In addition, when in the insert mounted state, flanks 33 of insert body 30, which respectively extend to the rear side in the direction of tool rotation T from cutting edges 35, serve as flanks of cutting edges 35. More specifically, a recess is imparted by inclining so as to recede towards the inside of the rough hemisphere formed by the rotational locus of cutting edges 35 moving towards the rear side in the direction of tool rotation T.

Furthermore, in grooves 34, walls 34B, which rise from bottom surfaces 34A towards flat surfaces 31A, are made to intersect an obtuse angle relative to bottom surfaces 34A, and form breaker wall surfaces that gradually protrude from bottom surfaces 34A serving as cutting faces.

In addition, in the present embodiment, when in the insert mounted state, grooves 34 that open to flanks 33 of insert body 30 are formed so as to be twisted about axis O towards the rear side in the direction of tool rotation T moving towards the rear side of axis O. Accompanying this, cutting edges 35 formed on the outer ridges of bottom surfaces 34A of grooves 34 are also formed so as to be twisted about axis O towards the rear side in the direction of tool rotation T moving towards the rear side of axis O.

In this case, as shown in FIG. 4 (view taken along direction B in FIG. 2), when viewed from the horizontal direction perpendicular to axis O, helix angle θ of cutting edges 35 twisted about axis O is set with within the range of 5° to 25°. Here, helix angle θ of cutting edges 35 indicates the tangent angle of cutting edges 35 in the insert mounted state when viewed from the direction perpendicular to the direction of thickness of the rough plate that is perpendicular to axis O and composes insert body 30 (direction B in FIG. 2). In addition, helix angle θ of cutting edges 35 gradually increases moving towards the rear side in the direction of axis O.

Furthermore, since grooves 34 are formed to as to be twisted about axis O, although their bottom surfaces 34A become curved, the sections of these bottom surfaces 34A located near axis O, including distal ends 35A of cutting edges 35, form a flat surface instead of a curved surface. This is to make it easier to roughly mutually coincide on axis O corresponding distal ends 35A of cutting edges 35 in the form of tangent lines located on the outer peripheral side of bottom surfaces 34A in grooves 34 when finishing grooves 34 by grinding using an abrasive to in the insert production process.

In addition, since the corresponding distal ends 35A of the pair of cutting edges 35 twisted about axis O in the insert mounted state are mutually made to roughly coincide on axis O, cutting edges 35 face the rear end side by extending to as to depict a smooth curved line from distal ends 35A. Thus, this pair of cutting edges 35 forms a gentle convex curve that protrudes towards the front side in the direction of tool rotation T as shown in FIG. 3 in the case of being viewed from the distal end side in the direction of axis O, or as shown in FIG. 4 in the case of being viewed from the horizontal direction that is perpendicular to axis O.

At this time, point 35B, which protrudes farthest to the front in the direction of tool rotation T on each cutting edge 35, is located on a straight line M that passes through center O1 of the rough hemisphere formed by the rotational locus of cutting edges 35 so that the angle of inclination α relative to axis O is within the range of 40° to 70°.

However, if cutting edges 35 are formed so as to be twisted about axis O towards the rear side in the direction of tool rotation T moving towards the rear end side in the direction of axis O, the thickness of insert body 30 at flanks 33 on which cutting edges 35 are formed reaches a maximum at point 35B where each cutting edge 35 protrudes farthest to the front in the direction of tool rotation T, and then gradually decreases from there moving towards the rear end side in the direction of axis O.

In contrast, in the present embodiment, as illustrated in FIGS. 2 and 4, a thickness d of insert body 30 at flanks 33 located on a straight line N. The straight line N passes through center O1 of the rough hemisphere formed by the rotational locus of cutting edges 35. Straight line N also forms an angle of inclination α of 90° relative to axis O. The thickness d is set within the range of 0.5 D to 0.9 D relative to the thickness D of the rough plate that composes insert body 30. Thickness D is the distance between mutually parallel flat surfaces 31A on both side faces 31 of insert body 30, namely the maximum thickness of insert body 30.

Moreover, in the present embodiment, chamfers 36, which are comprised by cutting away flanks 33 on an incline towards rear end surface 32, are formed in roughly linear sections that are roughly linear when viewed from overhead and intersect with rear end surface 32 of insert body 30.

Consequently, the pair of cutting edges 35 formed in flanks 33 of insert body 30 do not reach rear end surface 32 of insert body 30, but rather are located at a prescribed distance from rear end surface 32 towards the distal end side in the direction of axis O at those sections of flanks 33 where rear ends 35C of cutting edges 35 are roughly linear when viewed from overhead.

Furthermore, rear end 35C of each cutting edge 35 is located on a straight line L that passes through center O1 of the rough hemisphere formed by the rotational locus of cutting edges 35 and has an angle of inclination β relative to axis O that is greater than 90° (e.g., 100°).

In addition, a mounting hole 37 that passes through flat surfaces 31A of both side faces 31 in the direction of thickness of insert body 30 is formed in the center of both side faces 31 of insert body 30. The center of this mounting hole 37 coincides with center O1 of the rough hemisphere formed by the rotational locus of cutting edges 35.

An insert mounting seat 11 to which this type of insert is attached is formed in a groove that is indented on the rear end side along the direction of axis O as a result of the distal end of tool body 10 being cut away in the direction of diameter relative to axis O. Insert mounting seat 11 is provided with a bottom surface perpendicular to axis O facing the distal side, and a pair of inner surfaces that are mutually parallel rising from this bottom surface and are parallel to axis O, and opens in a U-shape when viewed from the side relative to the distal end surface of tool body 10.

The aforementioned insert is inserted into this insert mounting seat 11 so that first, together with rear end surface 32 of insert body 30 opposing the bottom surface of insert mounting seat 11, the pair of side faces 31 of insert body 30 are respectively opposing the pair of inner surfaces of insert mounting seat 11.

Subsequently, the insert is attached to insert mounting seat 11 by screwing in a clamping means in the form of a clamping bolt (not shown) into a clamp hole 12 provided in tool body 10 so as to pass through mounting hole 37 formed in insert body 30 of the insert inserted into insert mounting seat 11.

According to the present embodiment, as a result of setting the helix angle θ of cutting edges 35 that are twisted about axis O in the insert mounted state to within the range of 5° to 25°, a comparatively gentle but adequately large helix angle can be imparted to cutting edges 35, thereby making it possible to maintain satisfactory cutting by these cutting edges 35.

In addition, as a result of setting thickness d of insert body 30 at flanks 33 located on plane N, which passes through center O1 of the rough hemisphere formed by the rotational locus of cutting edges 35 and has an angle of inclination relative to axis O of 90°, to within the range of 0.5 D to 0.9 D based on cutting angles 35 set to a comparatively gentle helix angle θ, the thickness of insert body 30 at flanks 33 on the rear end side of insert body 30 is not decreased beyond that which is necessary.

As a result, in the present embodiment, in addition to being able to maintain satisfactory cutting by cutting edges 35 and reduce cutting resistance, stable cutting processing can be continued.

On the other hand, if the helix angle θ of cutting edges 35 is smaller than 5°, there is the possibility of being unable to obtain the effect of favorable cutting by cutting edges 35, while conversely if the helix angle θ is larger than 25°, there is the possibility of being unable to make thickness d of insert body 30 greater than or equal to 0.5 D.

In addition, if thickness d of insert body 30 is less than 0.5 D, there is the possibility of the rigidity of insert body 30 decreasing, while conversely if thickness d is greater than 0.9 D, there is the possibility of helix angle θ of cutting edges 35 being unable to be set to 5° or more.

Furthermore, in order to effectively eliminate the aforementioned problems, it is preferable to set the helix angle θ of cutting edges 35 to within the range of 5° to 15°, and set thickness d of insert body 30 to within the range of 0.7 D to 0.9 D.

In addition, in the present embodiment, as a result of cutting edges 35 being formed so as to twist about axis O, point 35B, which protrudes farthest to the front in the direction of tool rotation T of each of the pair of cutting edges 35 that forms a convex curve protruding towards the front side in the direction of tool rotation T, is located on a straight line M that passes through center O1 of the rough hemisphere formed by the rotational locus of cutting edges 35 and has an angle of inclination α relative to axis O within the range of 40° to 70°. As a result, helix angle θ of cutting edges 35 and thickness d of insert body 30 can be set in the proper balance.

Furthermore, it is preferable to set the angle of inclination a of straight line M relative to axis O to within the range of 50° to 70° in order to demonstrate the aforementioned effect more reliably.

Moreover, in the present embodiment, since chamfers 36, which are comprised by cutting away flanks 33 on an incline towards rear end surface 32, are formed on the rear end side of flanks 33 of insert body 30, the strength of insert body 30 can be enhanced by eliminating the section where the thickness of insert body 30 ends up decreasing, namely the section located on the rear end side of flanks 33 of insert body 30 near rear end surface 32.

What is claimed is:

1. A ball nose cutting insert, inserted into and attached to a groove-shaped insert-mounting seat formed on a distal end of a cutting tool body wherein the ball nose cutting insert is rotated about a longitudinal center axis of the cutting tool body, the ball nose cutting insert comprising:
a roughly plate-shaped insert body; and
a roughly circular cutting edge formed on a flank that is an outer peripheral surface of the plate-shaped insert body;
wherein:
the cutting edge is twisted at helix angles within a range of 5° to 25° with respect to the longitudinal center axis;
the ball nose cutting insert has a thickness of between 0.5 D and 0.9 D where its flank intersects with a plane that is perpendicular to the longitudinal center axis and which passes through a ball center of the ball nose cutting insert, where D is the thickness of the plate-shaped insert body;

mutually parallel flat surfaces formed on a pair of side faces of the insert body;

grooves that open to flanks by being indented from the flat surfaces are provided in the edges of the pair of side faces on a side facing a front side in the direction of tool rotation in the insert mounted state; and walls in the grooves rising from bottom surfaces in the grooves toward the flat surfaces and intersecting at an obtuse angle relative to the bottom surfaces in the grooves.

2. The insert according to claim 1 wherein the point on the cutting edge that protrudes farthest towards the front in the direction of tool rotation when the insert is attached to the insert mounting seat is located on a straight line that passes through the ball center of the insert and forms an angle of inclination within the range of 40° to 70° relative to the longitudinal center axis.

3. The insert according to claim 2 wherein a chamfer formed by cutting away the rear end side of a flank of the insert body towards the rear end surface of the insert body is formed in the insert body.

4. A ball end mill in which the insert according to claim 3 is inserted into and attached to a groove-shaped insert mounting seat formed on the distal end of the tool body that can be rotated about the longitudinal center axis.

5. A ball end mill in which the insert according to claim 2 is inserted into and attached to a groove-shaped insert mounting seat formed on the distal end of the tool body that can be rotated about the longitudinal center axis.

6. The insert according to claim 1 wherein a chamfer formed by cutting away the rear end side of a flank of the insert body towards the rear end surface of the insert body is formed in the insert body.

7. A ball end mill in which the insert according to claim 6 is inserted into and attached to a groove-shaped insert mounting seat formed on the distal end of the tool body that can be rotated about the longitudinal center axis.

8. A ball end mill in which the insert according to claim 1 is inserted into and attached to a groove-shaped insert mounting seat formed on the distal end of the tool body that can be rotated about the longitudinal center axis.

9. The insert according to claim 1 wherein the point on the cutting edge that protrudes farthest towards the front in the direction of tool rotation when the insert is attached to the insert mounting seat is located on a straight line that passes through the ball center of the insert and forms an angle of inclination within the range of 50° to 70° relative to the longitudinal center axis.

10. The insert according to claim 9 wherein a chamfer formed by cutting away the rear end side of a flank of the insert body towards the rear end surface of the insert body is formed in the insert body.

11. A ball nose cutting insert, inserted into and attached to a groove-shaped insert-mounting seat formed on a distal end of a cutting tool body wherein the ball nose cutting insert is rotated about a longitudinal center axis of the cutting tool body, the ball nose cutting insert comprising:

a roughly plate-shaped insert body; and a roughly circular cutting edge formed on a flank that is an outer peripheral surface of the plate-shaped insert body;

wherein:

the cutting edge is twisted at helix angles within a range of 5° to 15° with respect to the longitudinal center axis; and the ball nose cutting insert has a thickness of between 0.7 D and 0.9 D where its flank intersects with a plane that is perpendicular to the longitudinal center axis and which passes through a ball center of the ball nose cutting insert, where D is the thickness of the plate-shaped insert body.

12. The insert according to claim 11 wherein the point on the cutting edge that protrudes farthest towards the front in the direction of tool rotation when the insert is attached to the insert mounting seat is located on a straight line that passes through the ball center of the insert and forms an angle of inclination within the range of 40° to 70° relative to the longitudinal center axis.

13. The ball end mill in which the insert according to claim 12 is inserted into and attached to a groove-shaped insert mounting seat formed on the distal end of the tool body that can be rotated about the longitudinal center axis.

14. The insert according to claim 12 wherein a chamfer formed by cutting away the rear end side of a flank of the insert body towards the rear end surface of the insert body is formed in the insert body.

15. The ball end mill in which the insert according to claim 14 is inserted into and attached to a groove-shaped insert mounting seat formed on the distal end of the tool body that can be rotated about the longitudinal center axis.

16. The insert according to claim 11 wherein a chamfer formed by cutting away the rear end side of a flank of the insert body towards the rear end surface of the insert body is formed in the insert body.

17. The ball end mill in which the insert according to claim 16 is inserted into and attached to a groove-shaped insert mounting seat formed on the distal end of the tool body that can be rotated about the longitudinal center axis.

18. The ball end mill in which the insert according to claim 11 is inserted into and attached to a groove-shaped insert mounting seat formed on the distal end of the tool body that can be rotated about the longitudinal center axis.

19. The insert according to claim 11 wherein the point on the cutting edge that protrudes farthest towards the front in the direction of tool rotation when the insert is attached to the insert mounting seat is located on a straight line that passes through the ball center of the insert and forms an angle of inclination within the range of 50° to 70° relative to the longitudinal center axis.

20. The insert according to claim 19 wherein a chamfer formed by cutting away the rear end side of a flank of the insert body towards the rear end surface of the insert body is formed in the insert body.

* * * * *